UNITED STATES PATENT OFFICE.

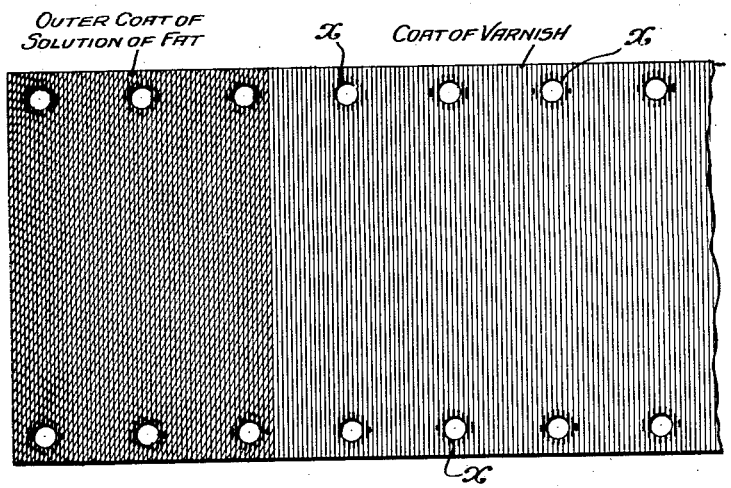

ADRIAAN PETER HERMAN TRIVELLI, OF THE HAGUE, NETHERLANDS.

RENOVATED CINEMATOGRAPH-FILM.

1,203,548.

Specification of Letters Patent. Patented Oct. 31, 1916.

Application filed June 30, 1915. Serial No. 37,366.

*To all whom it may concern:*

Be it known that I, ADRIAAN PETER HERMAN TRIVELLI, chemist, a subject of the Queen of the Netherlands, residing at Bentinckstraat 129, The Hague, Netherlands, have invented certain new and useful Improved Renovated Cinematograph-Films; and I do hereby declare the following to be a full, clear, and exact description of the invention.

Cinematograph films have the disadvantageous feature of being very liable to various kinds of damage when handled before, during and after their use for projection of the pictures thereon. Owing to this they show stripes and spots which do not form part of the image, so that they soon become inferior and after some time even entirely useless.

The present invention aims at the renovation of such inferior films in such a way that they favorably compare with, and to a certain extent even surpass, the original films.

In the first place the invention has for its object the removal of the so-called "rain." The "rain" is caused by shallow scratches caused by the continual winding and unwinding of the film. These scratches appear on both faces of the film and cause the light of the projector lamp to be diverted and intercepted so that the image on the projection screen shows stripes and loses part of its luminous power.

According to the invention both faces of the film are coated with varnish or lacquer, preferably by immersing the film in the varnish, in the same manner as a film is immersed in the developing solution when developing it, by which step the scratches are filled up and the whole film is coated with varnish or lacquer. The refractive index should preferably be about equal to the refractive index of the film composition and of the gelatin. It is obvious that for carrying out the above method a brand of varnish or lacquer should be used which does not scale off nor show cracks or clefts when being dried, but remains flexible after having been dried hard. The varnish or lacquer should also be of such a composition, that neither the varnish or lacquer, nor the solvent employed therein, will deleteriously affect either the celluloid or cellulose acetate base of the film, nor the gelatin emulsion upon the surface thereof.

The immersion of the film in the varnish or lacquer has the further advantageous feature that the perforations for the movement of the film are initially filled up with a thin membrane of varnish which before and during the operation of drying breaks up and forms around the perforation an extra layer imparting additional strength to the walls of the hole, (*i. e.*, a kind of reinforcement thereof). In order to make the films thus treated also suitable for use in the tropics and consequently to prevent the film from sticking together when wound up in a moist and hot atmosphere, the film, after the varnish or lacquer has thoroughly dried, is coated with an extremely thin skin of fat or grease by passing the same through a solution of grease or oil in petrol or the like, a five or ten per cent. solution of the oil or grease being suitable for the purpose.

In the accompanying drawing there is indicated in a face view of the end of a film, drawn to an enlarged scale, a coat of varnish applied thereto and over this an outer coat of a solution of fat being applied over the coat of varnish for the purpose above described. The slightly thickened rings of varnish at the perforations *x* are also indicated.

After having been in use for some time cinematographic films gradually show another defect, namely, the production of larger or smaller dark spots in the image. These spots appear to be caused by oil splashed from the projecting apparatus and taken up by the sensitive layer and finally deposited between said layer and the film. These spots are removed by immersing the film for some hours in a fat solvent medium, *e. g.*, petrol or benzin. The oil during said treatment is drawn through the sensitive layer to the outer surface where it is dissolved by the petrol or the like. It is obvious that films coated with a varnish or lacquer insoluble in petrol cannot be acted upon thereby, and that the treatment with petrol must therefore be carried out previously to the varnishing of the film.

The use of particular varnish in the process herein described, forms the subject matter of my copending application No. 113,016 filed August 3, 1916.

I claim:

1. A renovated cinematograph film, having its surfaces coated with a permanently flexible varnish, and the perforations in the edges of said film being reinforced by thickened rings of dry varnish.

2. A renovated cinematographic film comprising a film having a coating of a dried varnish thereupon, said film and coating being free from grease spots, and the holes in the edges of said film being reinforced by thickened rings of dried varnish.

In testimony whereof I have signed my name to this specification.

ADRIAAN PETER HERMAN TRIVELLI.